United States Patent
Son et al.

(10) Patent No.: US 12,140,738 B2
(45) Date of Patent: Nov. 12, 2024

(54) OPTICAL IMAGING SYSTEM

(71) Applicant: Samsung Electro-Mechanics Co., Ltd., Suwon-si (KR)

(72) Inventors: Ju Hwa Son, Suwon-si (KR); In Gun Kim, Suwon-si (KR); Yong Joo Jo, Suwon-si (KR); Ju Sung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/522,674

(22) Filed: Nov. 29, 2023

(65) Prior Publication Data

US 2024/0094512 A1 Mar. 21, 2024

Related U.S. Application Data

(63) Continuation of application No. 17/727,099, filed on Apr. 22, 2022, now Pat. No. 11,867,885, which is a (Continued)

(30) Foreign Application Priority Data

Jan. 24, 2018 (KR) .................. 10-2018-0008941
Jun. 12, 2018 (KR) .................. 10-2018-0067541

(51) Int. Cl.
 *G02B 13/00* (2006.01)
 *G02B 9/64* (2006.01)

(52) U.S. Cl.
 CPC ........... *G02B 13/0045* (2013.01); *G02B 9/64* (2013.01)

(58) Field of Classification Search
 CPC .. G02B 13/0045; G02B 13/002; G02B 13/18; G02B 9/64; G02B 9/62; G02B 30/00
 (Continued)

(56) References Cited

U.S. PATENT DOCUMENTS

| 4,981,344 A | 1/1991 | Ueda |
| 9,110,271 B2 | 8/2015 | Sekine |

(Continued)

FOREIGN PATENT DOCUMENTS

| CN | 203941337 U | 11/2014 |
| CN | 204028445 U | 12/2014 |

(Continued)

OTHER PUBLICATIONS

Korean Office Action issued on May 7, 2019, in counterpart Korean Patent Application No. 10-2018-0067541 (4 pages in English, 4 pages in Korean).

(Continued)

*Primary Examiner* — Travis S Fissel
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens sequentially arranged along an optical axis from an object side toward an image side. The fifth lens has a positive refractive power, a focal length of the fifth lens is smaller than an overall focal length of the optical imaging system, and $-0.38 \leq R10/f \leq -0.32$, where R10 is a radius of curvature of an image-side surface of the fifth lens and f is the overall focal length of the optical imaging system.

16 Claims, 6 Drawing Sheets

Related U.S. Application Data continuation of application No. 16/186,810, filed on Nov. 12, 2018, now Pat. No. 11,340,429.

(58) Field of Classification Search
USPC .................. 357/657, 682, 708, 751, 755
See application file for complete search history.

(56) References Cited

U.S. PATENT DOCUMENTS

| | | | |
|---|---|---|---|
| 9,435,986 | B2 | 9/2016 | Tsai et al. |
| 9,706,093 | B2 | 7/2017 | Chen |
| 9,759,894 | B2 | 9/2017 | Teraoka |
| 9,798,112 | B2 | 10/2017 | Huang |
| 10,018,805 | B2 | 7/2018 | Baik |
| 11,340,429 | B2 | 5/2022 | Son et al. |
| 2013/0271851 | A1 | 10/2013 | Souma |
| 2014/0085736 | A1 | 3/2014 | Chen et al. |
| 2014/0133015 | A1 | 5/2014 | Hsueh et al. |
| 2014/0253782 | A1* | 9/2014 | Tsai ............... H04N 23/55 359/708 |
| 2014/0376105 | A1* | 12/2014 | Sekine ............ G02B 3/02 359/708 |
| 2015/0009578 | A1 | 1/2015 | Shinohara et al. |
| 2015/0103414 | A1 | 4/2015 | Baik |
| 2015/0212298 | A1 | 7/2015 | Shinohara et al. |
| 2015/0286037 | A1 | 10/2015 | Ono |
| 2016/0124191 | A1 | 5/2016 | Hashimoto |
| 2016/0320593 | A1 | 11/2016 | Baik |
| 2017/0045714 | A1 | 2/2017 | Huang |
| 2017/0059825 | A1 | 3/2017 | Tang et al. |
| 2017/0168267 | A1 | 6/2017 | Tang et al. |
| 2017/0192203 | A1 | 7/2017 | Chang |
| 2017/0199350 | A1 | 7/2017 | Teraoka |
| 2017/0276910 | A1 | 9/2017 | Chen |
| 2017/0336606 | A1 | 11/2017 | Lai et al. |
| 2017/0357081 | A1 | 12/2017 | Dai et al. |
| 2018/0003926 | A1 | 1/2018 | Huang |
| 2018/0188482 | A1 | 7/2018 | Jhang et al. |
| 2019/0121086 | A1 | 4/2019 | Shi et al. |

FOREIGN PATENT DOCUMENTS

| | | | |
|---|---|---|---|
| CN | 104570280 | A | 4/2015 |
| CN | 106443986 | A | 2/2017 |
| CN | 106855653 | A | 6/2017 |
| CN | 106896478 | A | 6/2017 |
| CN | 107367827 | A | 11/2017 |
| CN | 107621683 | A | 1/2018 |
| JP | 2011-123304 | A | 6/2011 |
| JP | 2012-123271 | A | 6/2012 |
| JP | 2015-4842 | A | 1/2015 |
| JP | 2015-28586 | A | 2/2015 |
| JP | 2015-72403 | A | 4/2015 |
| JP | 2015-141267 | A | 8/2015 |
| JP | 5890947 | B1 | 3/2016 |
| JP | 2016-85431 | A | 5/2016 |
| JP | 2017-122843 | A | 7/2017 |
| KR | 10-1580382 | B1 | 12/2015 |

OTHER PUBLICATIONS

U.S. Appl. No. 17/727,099, filed Apr. 22, 2022, Ju Hwa Son et al., Samsung Electro-Mechanics Co., Ltd.

Korean Office Action issued on Jan. 8, 2020, in counterpart Korean Patent Application No. 10-2018-0067541 (8 pages in English, 6 pages in Korean).

Chinese Office Action issued on Nov. 4, 2020, in counterpart Chinese Patent Application No. 201910068409.X (7 pages in English, 9 pages in Chinese).

Korean Office Action issued on Jan. 4, 2021, in counterpart Korean Patent Application No. 10-2020-0124713 (8 pages in English, 6 pages in Korean).

F.A. Callegari, "Thick lenses systems," *International Journal of Physical Sciences*, vol. 16, No. 3, pp. 96-109, Jul. 31, 2021, Article No. FBBE95867185, https://doi.org/10.5897/IJPS2021.4950.

Screenshots of matrix calculations and relied on in Final Office Action issued on Sep. 9, 2021, in grandparent U.S. Appl. No. 16/186,810.

Korean Office Action issued on Oct. 14, 2021, in counterpart Korean Patent Application No. 10-2021-0131561 (6 pages in English, 4 pages in Korean).

Chinese Office Action issued on May 26, 2022, in counterpart Chinese Patent Application No. 202110890038.0 (10 pages in English, 12 pages in Chinese).

Korean Office Action issued on Jul. 27, 2022, in counterpart Korean Patent Application No. 10-2022-0089749 (12 pages in English, 7 pages in Korean).

Korean Office Action issued on Sep. 25, 2023, in counterpart Korean Patent Application No. 10-2023-0056477 (8 pages in English, 5 pages in Korean).

* cited by examiner

OPTICAL IMAGING SYSTEM

CROSS-REFERENCE TO RELATED APPLICATIONS

This application is a continuation of application Ser. No. 17/727,099 filed on Apr. 22, 2022, now U.S. Pat. No. 11,867,885 issued on Jan. 9, 2024, which is a continuation of application Ser. No. 16/186,810 filed on Nov. 12, 2018, now U.S. Pat. No. 11,340,429 issued on May 24, 2022, and claims the benefit under 35 USC 119(a) of Korean Patent Application No. 10-2018-0008941 filed on Jan. 24, 2018, and Korean Patent Application No. 10-2018-0067541 filed on Jun. 12, 2018, in the Korean Intellectual Property Office, the entire disclosures of which are incorporated herein by reference for all purposes.

BACKGROUND

1. Field

The following description relates to an optical imaging system.

2. Description of Related Art

Mobile communications terminals have been provided with camera modules, enabling video calling and image capturing. In addition, as utilization of camera modules mounted in the mobile communications terminals has increased, camera modules for mobile communications terminals have gradually been required to have high resolution and improved performance.

Therefore, the number of lenses included in the camera module has increased. However, since mobile communications terminals in which the camera modules are mounted have tended to be miniaturized, it is very difficult to arrange the lenses in the camera module.

Therefore, research into technology capable of performing aberration correction to implement high resolution and arranging a plurality of lenses in a limited amount of space has been required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens sequentially arranged along an optical axis from an object side toward an image side. The fifth lens has a positive refractive power, a focal length of the fifth lens is smaller than an overall focal length of the optical imaging system, and $-0.38 \leq R10/f \leq -0.32$, where R10 is a radius of curvature of an image-side surface of the fifth lens and f is the overall focal length of the optical imaging system.

The optical imaging system may be configured such that $0.88 \leq f5/f \leq 0.93$, where f5 is a focal length of the fifth lens.

The optical imaging system may be configured such that $0.8 \leq f1/f < 0.9$, where f1 is a focal length of the first lens.

The optical imaging system may include an image sensor to convert light incident on the image sensor through the first to seventh lenses into an electrical signal, and may be configured such that $TTL/f < 1.3$, where TTL is a distance from an object-side surface of the first lens to an imaging plane of the image sensor.

The optical imaging system may be configured such that $0.41 \text{ mm} < T3 < 0.48 \text{ mm}$, where T3 is a thickness of the third lens at the optical axis.

The optical imaging system may be configured such that $0.26 \text{ mm} < T4 < 0.35 \text{ mm}$, where T4 is a thickness of the fourth lens at the optical axis.

The optical imaging system may be configured such that $0.45 \text{ mm} < T5 < 0.57 \text{ mm}$, where T5 is a thickness of the fifth lens at the optical axis.

The first lens may have a positive refractive power, an object-side surface of the first lens may be convex, and an image-side surface of the first lens may be concave.

The second lens may have a negative refractive power, an object-side surface of the second lens may be convex, and an image-side surface of the second lens may be concave.

The third lens may have a positive refractive power.

At least one inflection point may be included on an object-side surface of the third lens.

The sixth lens may have a positive refractive power, an object-side surface of the sixth lens may be concave, and an image-side surface of the sixth lens may be convex.

In another general aspect, an optical imaging system includes a first lens having a positive refractive power, a second lens having a negative refractive power, a third lens having a positive refractive power, a fourth lens having a positive or negative refractive power, a fifth lens having a positive refractive power, a sixth lens having a positive refractive power, and a seventh lens having a negative refractive power. The first to seventh lenses are sequentially arranged along an optical axis from an object side toward an image side, and $0.88 \leq f5/f \leq 0.93$, where f5 is a focal length of the fifth lens and f is an overall focal length of the optical imaging system.

Among the first to seventh lens, an absolute value of a focal length of the seventh lens may be the smallest, an absolute value of a focal length of the first lens may be the second smallest, and an absolute value of the focal length of the fifth lens may be the third smallest.

An absolute value of a focal length of the first lens, an absolute value of the focal length of the fifth lens, and an absolute value of a focal length of the seventh lens may all smaller than the overall focal length of the optical imaging system.

The fifth lens may include an object-side surface that is concave in a paraxial region and an image-side surface that is convex in the paraxial region.

An Abbe number of the fourth lens may be different from an Abbe number of the fifth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
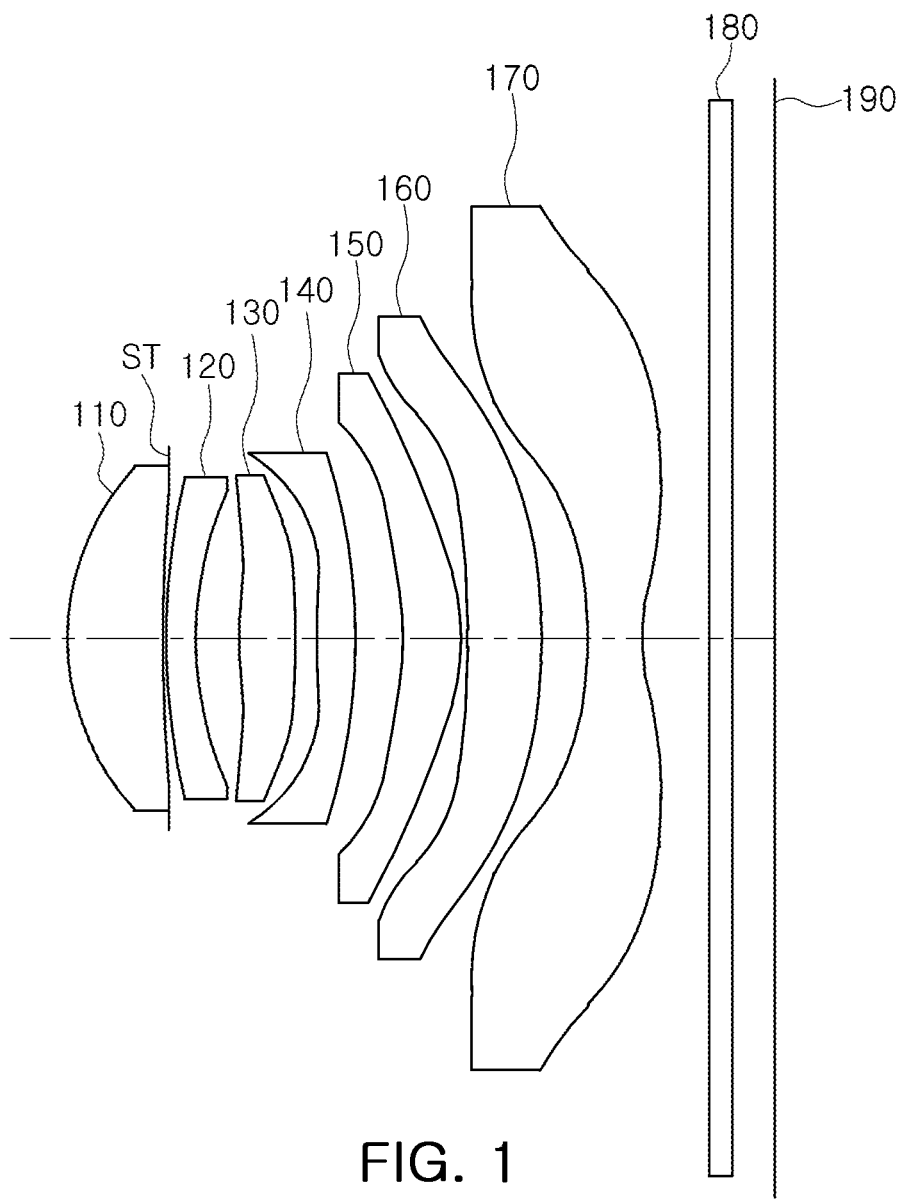
FIG. 1 is a view illustrating an optical imaging system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

Optical imaging systems according to the examples disclosed herein may include a plurality of lenses arranged along an optical axis. The plurality of lenses may be arranged to be spaced apart from each other by preset distances along the optical axis.

As an example, an optical imaging system may include seven lenses.

In an example in which the optical imaging system includes seven lenses, a first lens refers to a lens closest to an object, while a seventh lens refers to a lens closest to an image sensor.

In addition, a first surface of each lens refers to a surface thereof closest to an object side (or an object-side surface) and a second surface of each lens refers to a surface thereof closest to an image side (or an image-side surface). Further, all numerical values of radii of curvature, thicknesses, distances, effective aperture radii, and the like, of lenses are indicated by millimeters (mm), and an angle is indicated by degrees.

The effective aperture radius refers to a radius of one surface (an object-side surface and an image-side surface) of each lens through which light actually passes. As an example, an effective aperture radius of an object-side surface of the first lens refers to a straight line distance between an end portion of the object-side surface of the first lens on which light is incident and the optical axis.

In a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a very narrow region in the vicinity of the optical axis.

An optical imaging system according to the examples disclosed herein may include seven lenses.

For example, an optical imaging system may include a first lens, a second lens, a third lens, a fourth lens, a fifth lens, a sixth lens, and a seventh lens sequentially arranged from the object side.

However, an optical imaging system is not limited to only including seven lenses, but may further include other components.

For example, an optical imaging system may further include an image sensor converting an image of a subject incident on the image sensor into an electrical signal.

An optical imaging system may include an infrared cut-off filter filtering infrared light. The infrared cut-off filter may be disposed between a lens (as an example, the seventh lens) closest to the image sensor and the image sensor.

An optical imaging system may include a stop controlling an amount of light. For example, the stop may be disposed between the first lens and the second lens or between the second lens and the third lens.

In an optical imaging system, all of the lenses may be formed of plastic materials.

The plurality of lenses may have at least one aspherical surface.

At least one of first and second surfaces of all of the first to seventh lenses may be aspherical. The aspherical surfaces of the first to seventh lenses may be represented by the following Equation 1.

$$Z = \frac{cr^2}{1 + \sqrt{1-(1+k)c^2r^2}} + Ar^4 + Br^6 + Cr^8 + Dr^{10} + Er^{12} + Fr^{11} + Gr^{16} + Hr^{18} + Jr^{20} \quad (1)$$

In Equation 1, c is a curvature (an inverse of a radius of curvature) of a lens, K is a conic constant, and Y is a distance from a certain point on an aspherical surface of the lens to an optical axis in a direction perpendicular to the optical axis. Constants A to H and J are aspherical coefficients. Z is a distance between the certain point on the aspherical surface of the lens at the distance Y and a tangential plane meeting the apex of the aspherical surface of the lens.

An optical imaging system including the first to seventh lenses may have positive refractive power/negative refractive power/positive refractive power/negative refractive power/positive refractive power/positive refractive power/negative refractive power sequentially from the object side.

An optical imaging system including the first to seventh lenses may have positive refractive power/negative refractive power/positive refractive power/positive refractive power/positive refractive power/positive refractive power/negative refractive power sequentially from the object side.

An optical imaging system may satisfy the following Conditional Expressions.

| | |
|---|---|
| $0.88 \leq f5/f \leq 0.93$ | (Conditional Expression 1) |
| $-0.38 \leq R10/f \leq -0.32$ | (Conditional Expression 2) |
| $0.8 < f1/f < 0.9$ | (Conditional Expression 3) |
| $TTL/f < 1.3$ | (Conditional Expression 4) |
| $0.41 \text{ mm} < T3 < 0.48 \text{ mm}$ | (Conditional Expression 5) |
| $0.26 \text{ mm} < T4 < 0.35 \text{ mm}$ | (Conditional Expression 6) |
| $0.45 \text{ mm} < T5 < 0.57 \text{ mm}$ | (Conditional Expression 7) |

In the Conditional Expressions, f is an overall focal length of the optical imaging system, f5 is a focal length of the fifth lens, R10 is a radius of curvature of an image-side surface of the fifth lens, f1 is a focal length of the first lens, TTL is a distance from an object-side surface of the first lens to an imaging plane of the image sensor, T3 is a thickness of the third lens at an optical axis, T4 is a thickness of the fourth lens at an optical axis, and T5 is a thickness of the fifth lens at an optical axis.

The first to seventh lenses constituting an optical imaging system will be described.

The first lens may have a positive refractive power. The first lens may have a meniscus shape of which an object-side surface is convex. A first surface of the first lens may be convex, and a second surface of the first lens may be concave.

At least one of the first and second surfaces of the first lens may be aspherical. For example, both surfaces of the first lens may be aspherical.

The second lens may have a negative refractive power. The second lens may have a meniscus shape of which an object-side surface is convex. A first surface of the second lens may be convex, and a second surface of the second lens may be concave.

At least one of the first and second surfaces of the second lens may be aspherical. For example, both surfaces of the second lens may be aspherical.

The first lens and the second lens may be formed of plastics having different optical characteristics.

The third lens may have a positive refractive power. The third lens may have a meniscus shape of which an object-side surface is convex. A first surface of the third lens may be convex, and a second surface of the third lens may be concave.

Both surfaces of the third lens may be convex. The first and second surfaces of the third lens may be convex.

The third lens may have a meniscus shape of which an image-side surface is convex. A first surface of the third lens may be concave, and a second surface of the third lens may be convex.

At least one of the first and second surfaces of the third lens may be aspherical. For example, both surfaces of the third lens may be aspherical.

At least one inflection point may be formed on the first surface of the third lens. For example, the first surface of the third lens may be convex in a paraxial region and become concave toward an edge of the first surface.

The second lens and the third lens may be formed of plastics having different optical characteristics.

The fourth lens may have a positive or negative refractive power. The fourth lens may have a meniscus shape of which an object-side surface is convex. A first surface of the fourth lens may be convex, and a second surface of the fourth lens may be concave.

The fourth lens may have a meniscus shape of which an image-side surface is convex. A first surface of the fourth lens may be concave, and a second surface of the fourth lens may be convex.

At least one of the first and second surfaces of the fourth lens may be aspherical. For example, both surfaces of the fourth lens may be aspherical.

The third lens and the fourth lens may be formed of plastics having different optical characteristics.

The fifth lens may have a positive refractive power. The fifth lens may have a meniscus shape of which an image-side surface is convex. A first surface of the fifth lens may be concave, and a second surface of the fifth lens may be convex.

At least one of the first and second surfaces of the fifth lens may be aspherical. For example, both surfaces of the fifth lens may be aspherical.

The fourth lens and the fifth lens may be formed of plastics having different optical characteristics.

A focal length of the fifth lens may be smaller than an overall focal length of the optical imaging system.

The sixth lens may have a positive refractive power. The sixth lens may have a meniscus shape of which an image-side surface is convex. A first surface of the sixth lens may be concave, and a second surface of the sixth lens may be convex.

At least one of the first and second surfaces of the sixth lens may be aspherical. For example, both surfaces of the sixth lens may be aspherical.

The seventh lens may have a negative refractive power. Both surfaces of the seventh lens may be concave. The first and second surfaces of the seventh lens may be concave.

At least one of the first and second surfaces of the seventh lens may be aspherical. For example, both surfaces of the seventh lens may be aspherical.

At least one inflection point may be formed on at least one of the first and second surfaces of the seventh lens. For example, the first surface of the seventh lens may be concave in the paraxial region and become convex toward an edge of the first surface. The second surface of the seventh lens may be concave in the paraxial region and become convex at an edge of the second surface.

Among the first to seventh lenses, an absolute value of a focal length of the seventh lens may be the smallest, an absolute value of a focal length of the first lens may be the second smallest, and an absolute value of a focal length of the fifth lens may be the third smallest.

Each of the absolute values of the focal lengths of the first lens, the fifth lens, and the seventh lens may be smaller than the overall focal length.

In the optical imaging system, a plurality of lenses may perform an aberration correction function to increase aberration improvement performance.

As an example, the first to fifth lenses may be formed of the plastic having optical characteristics different from those of lenses adjacent thereto to improve chromatic aberration correction performance.

In addition, the above Conditional Expression may be satisfied to easily correct coma aberration.

An optical imaging system according to an example will be described with reference to FIGS. 1 and 2.

The optical imaging system may include a first lens 110, a second lens 120, a third lens 130, a fourth lens 140, a fifth lens 150, a sixth lens 160, and a seventh lens 170, and may further include an infrared cut-off filter 180, an image sensor 190, and a stop ST.

Lens characteristics (radii of curvature, thicknesses of lenses or distances between the lenses, refractive indices, Abbe numbers, and effective aperture radii) of each lens are represented in Table 1.

TABLE 1

| Surface No. | Element | Radius of Curvature | Thickness or Distance | Refractive Index | Abbe Number | Effective Aperture Radius | Focal Length |
|---|---|---|---|---|---|---|---|
| S1 | First Lens | 1.835227134 | 0.757 | 1.546 | 56.114 | 1.295 | 3.785 |
| S2 | Stop | 14.02910742 | 0.025 | | | 1.231 | |
| S3 | Second Lens | 5.338657962 | 0.230 | 1.667 | 20.353 | 1.200 | −9.661 |
| S4 | | 2.869255055 | 0.359 | | | 1.100 | |
| S5 | Third Lens | 20.47879001 | 0.412 | 1.546 | 56.114 | 1.136 | 47.587 |
| S6 | | 96.0386119 | 0.180 | | | 1.226 | |
| S7 | Fourth Lens | 14.00757029 | 0.272 | 1.667 | 20.353 | 1.232 | −103.766 |
| S8 | | 11.55923716 | 0.368 | | | 1.402 | |
| S9 | Fifth Lens | −4.493364206 | 0.473 | 1.546 | 56.114 | 1.614 | 4.234 |
| S10 | | −1.582976522 | 0.025 | | | 1.986 | |
| S11 | Sixth Lens | −4.42065593 | 0.576 | 1.546 | 56.114 | 2.173 | 21.906 |
| S12 | | −3.376062752 | 0.354 | | | 2.409 | |
| S13 | Seventh Lens | −4.39306147 | 0.450 | 1.546 | 56.114 | 2.935 | −2.622 |
| S14 | | 2.200566162 | 0.500 | | | 3.250 | |
| S15 | Infrared Cut-off Filter | Infinity | 0.210 | 1.518 | 64.197 | 3.774 | |
| S16 | | Infinity | 0.304 | | | 3.845 | |
| S17 | Imaging Plane | Infinity | 0.005 | | | 4.203 | |

An overall focal length f of the optical imaging system may be 4.5814 mm, a field of view (FOV) of the optical imaging system may be 79.799°, Fno may be 1.7689, TTL may be 5.5 mm, and an effective aperture radius of an object-side surface of the first lens 110 may be 1.295 mm.

Fno is a number indicating a brightness of the optical imaging system, and TTL is a distance from the object-side surface of the first lens 110 to the imaging plane of the image sensor 190. The effective aperture radius refers to a straight line distance between an end portion of the object-side surface of the first lens 110 on which light is incident and an optical axis.

In the example, the first lens 110 may have a positive refractive power, and a first surface of the first lens 110 may be convex in a paraxial region and a second surface of the first lens 110 may be concave in the paraxial region.

The second lens 120 may have a negative refractive power, and a first surface of the second lens 120 may be convex in a paraxial region and a second surface of the second lens 120 may be concave in the paraxial region.

The first lens 110 and the second lens 120 may be formed of plastics having different optical characteristics. For example, Abbe numbers of the first lens 110 and the second lens 120 may be different from each other.

The stop ST may be disposed between the first lens 110 and the second lens 120.

The third lens 130 may have a positive refractive power, and a first surface of the third lens 130 may be convex in a paraxial region and a second surface of the third lens 130 may be concave in the paraxial region.

At least one inflection point may be formed on the first surface of the third lens 130. For example, the first surface of the third lens 130 may be convex in the paraxial region and become concave toward an edge of the first surface.

The second lens 120 and the third lens 130 may be formed of plastics having different optical characteristics. For example, Abbe numbers of the second lens 120 and the third lens 130 may be different from each other.

The fourth lens 140 may have a negative refractive power, and a first surface of the fourth lens 140 may be convex in a paraxial region and a second surface of the fourth lens 140 may be concave in the paraxial region.

The third lens 130 and the fourth lens 140 may be formed of plastics having different optical characteristics. For example, Abbe numbers of the third lens 130 and the fourth lens 140 may be different from each other.

The fifth lens 150 may have a positive refractive power, and a first surface of the fifth lens 150 may be concave in a paraxial region and a second surface of the fifth lens 150 may be convex in the paraxial region.

The fourth lens 140 and the fifth lens 150 may be formed of plastics having different optical characteristics. For example, Abbe numbers of the fourth lens 140 and the fifth lens 150 may be different from each other.

The sixth lens 160 may have a positive refractive power, and a first surface of the sixth lens 160 may be concave in a paraxial region and a second surface of the sixth lens 160 may be convex in the paraxial region.

The seventh lens 170 may have a negative refractive power, and a first surface and a second surface of the seventh lens 170 may be concave in a paraxial region.

At least one inflection point may be formed on the first surface and the second surface of the seventh lens 170. For example, the first surface and the second surface of the seventh lens 170 may be concave in the paraxial region and become convex toward an edge of the first surface and the second surface.

Respective surfaces of the first to seventh lenses 110 to 170 may have aspherical coefficients as illustrated in Table 2. For example, all of object-side surfaces and image-side surfaces of the first to seventh lenses 110 to 170 may be aspherical.

TABLE 2

| | S1 | S2 | S3 |
|---|---|---|---|
| R | 1.83522713415814E+00 | 1.40291074196139E+01 | 5.33865796222443E+00 |
| K | −9.74633548300962E−01 | 2.72655517694607E+00 | 5.31810409723758E+00 |
| A | 2.26590833328727E−02 | −1.43688087533654E−01 | −1.94617508812868E−01 |
| B | −2.00584194164569E−02 | 4.45086191980934E−01 | 5.46498848177292E−01 |
| C | 8.97737510812674E−02 | −7.67984276681622E−01 | −9.80213366238904E−01 |
| D | −1.79987385103844E−01 | 8.30297202726275E−01 | 1.20925985530388E+00 |
| E | 2.02393547048812E−01 | −5.76237844585000E−01 | −1.00043413728333E+00 |
| F | −1.30506114113822E−01 | 2.48953403578293E−01 | 5.37707068096891E−01 |
| G | 4.46081708796555E−02 | −6.11205895670732E−02 | −1.67200911305756E−01 |
| H | −6.36344910136862E−03 | 6.41502929939828E−03 | 2.23872174719243E−02 |
| J | | | |

| | S4 | S5 | S6 |
|---|---|---|---|
| R | 2.86925505487888E+00 | 2.04787900111703E+01 | 9.60386118996625E+01 |
| K | −8.18300692945701E−01 | 0.00000000000000E+00 | 0.00000000000000E+00 |
| A | −7.32534890079652E−02 | −4.33693517640893E−02 | −1.18311597939585E−01 |
| B | 1.98592465423210E−01 | −2.82893475798192E−02 | 1.25800277353217E−01 |
| C | −3.99195865262604E−01 | 1.41019972102376E−01 | −2.60730544744581E−01 |
| D | 6.62569122574163E−01 | −3.76424553439978E−01 | 3.81649877920399E−01 |
| E | −7.34632516315750E−01 | 5.21668307760453E−01 | −4.01637900940920E−01 |
| F | 5.12678849902191E−01 | −4.05245918804513E−01 | 2.66167185618519E−01 |
| G | −1.93384868435191E−01 | 1.70108688862680E−01 | −9.22207585962108E−02 |
| H | 3.01207393075946E−02 | −2.96747621149980E−02 | 1.54732557291730E−02 |
| J | | | |

| | S7 | S8 | S9 |
|---|---|---|---|
| R | 1.40075702916491E+01 | 1.15592371571900E+01 | −4.49336420577339E+00 |
| K | −7.50001392010044E+00 | −4.33425266095967E+01 | −3.04954010396314E+01 |
| A | −2.08292653318237E−01 | −1.43357692122282E−01 | −1.16402303245625E−01 |
| B | 5.66148591028170E−02 | 2.76742587689277E−01 | 1.62265812296945E−01 |
| C | 3.40600985672729E−02 | 1.49392908679366E−01 | −1.14712569994533E−01 |
| D | −2.02516416176840E−01 | −3.18985424830112E−01 | 2.29794627269044E−02 |
| E | 3.37512666660287E−01 | 3.52614938939856E−01 | 1.89459451732170E−02 |
| F | −2.98411113995864E−01 | −2.19999718253768E−01 | −1.57987873959162E−02 |
| G | 1.32104121252353E−01 | 7.24759120906351E−02 | 4.54354912733504E−03 |
| H | −2.26110146358224E−02 | −9.55215892884372E−03 | −4.61188239736631E−04 |
| J | | | |

| | S10 | S11 | S12 |
|---|---|---|---|
| R | −1.58297652182677E+00 | −4.42065593027725E+00 | −3.37606275153478E+00 |
| K | −1.60480118848050E+00 | 9.08002671441049E−02 | −2.19041021858542E−01 |
| A | 7.10808502750410E−02 | 1.73338488647160E−01 | 1.55852883866887E−01 |

TABLE 2-continued

|   | | | |
|---|---|---|---|
| B | −6.27870641868130E−02 | −2.16667189272054E−31 | −2.01911582723052E−01 |
| C | 8.16676861811079E−02 | 1.49353721303268E−01 | 1.23928384185870E−01 |
| D | −6.61406949004544E−02 | −6.98540049571404E−02 | −4.86815912471080E−02 |
| E | 2.93674428236592E−02 | 2.00227395470170E−02 | 1.27732855642596E−02 |
| F | −7.13169084322472E−03 | −3.25049871848573E−03 | −2.10168018994990E−03 |
| G | 8.74411265592385E−04 | 2.73473609723023E−04 | 1.91571259684018E−04 |
| H | −4.28055956949656E−05 | −9.26453588338803E−06 | −7.28354177645412E−06 |
| J |  |  |  |

|   | S13 | S14 |
|---|---|---|
| R | −4.39306146960093E+00 | 2.20056616235733E+00 |
| K | −2.35503787444693E+00 | −1.28300867659821E+00 |
| A | 3.72126377803153E−03 | −1.36062977139846E−01 |
| B | −1.27637159255959E−01 | 4.38338125997012E−02 |
| C | 8.97053143583044E−02 | −1.02008853905546E−02 |
| D | −2.63226232169784E−02 | 1.86907054395250E−03 |
| E | 4.46815594250577E−03 | −2.84833394276870E−04 |
| F | −4.40847059949695E−04 | 3.29842078388680E−05 |
| G | 2.37518537350670E−05 | −2.58132027389573E−06 |
| H | −5.42645480112993E−07 | 1.20687625160571E−07 |
| J |  | −2.54483614636522E−09 |

Figure 2:
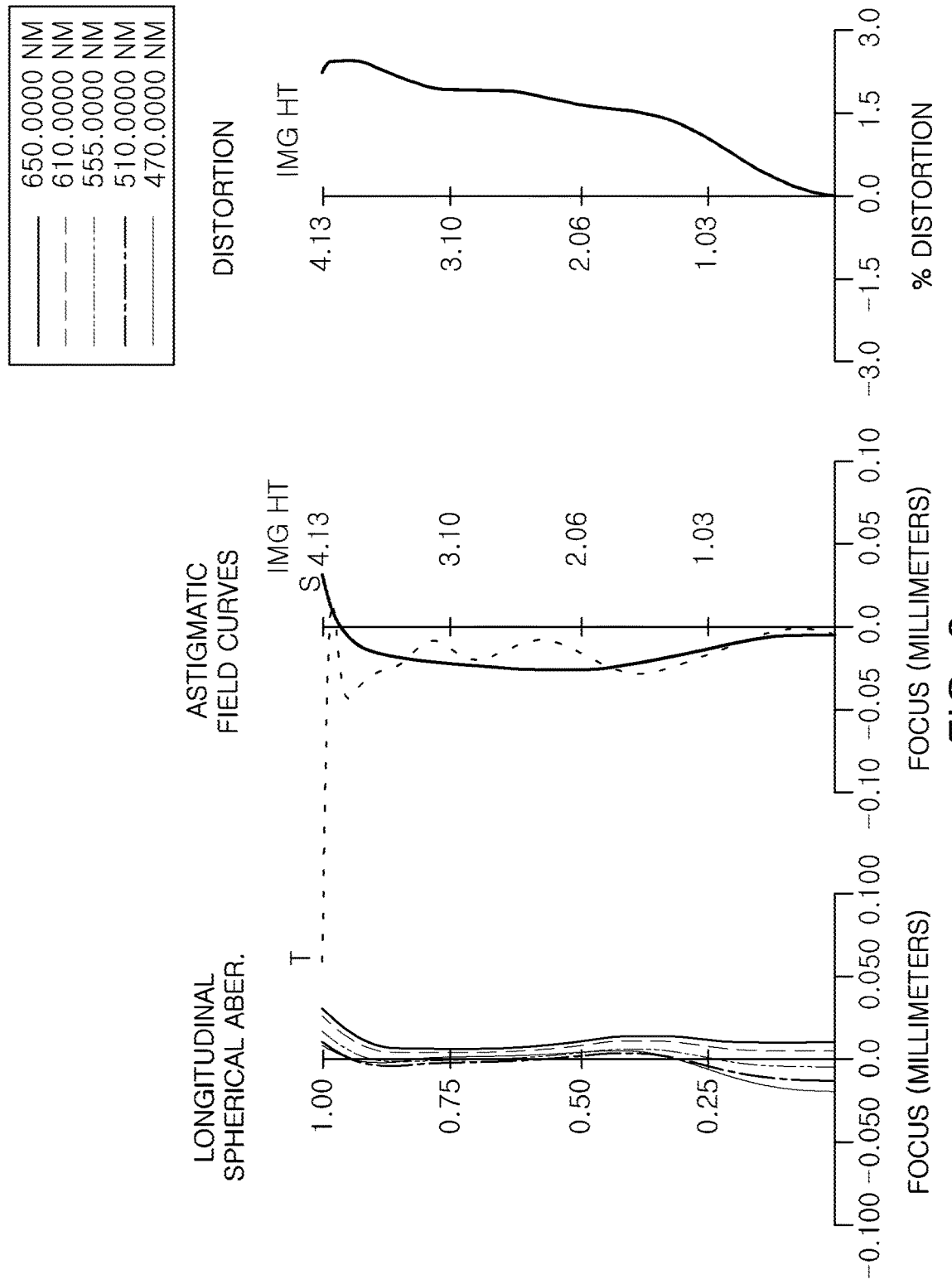
FIG. 2 illustrates graphs having curves representing aberration characteristics of the optical imaging system illustrated in FIG. 1.

The optical imaging system configured as described above may have the aberration characteristics illustrated in FIG. 2.

An optical imaging system according to another example will be described with reference to FIGS. 3 and 4.

The optical imaging system may include a first lens 210, a second lens 220, a third lens 230, a fourth lens 240, a fifth lens 250, a sixth lens 260, and a seventh lens 270, and may further include an infrared cut-off filter 280, an image sensor 290, and a stop ST.

Lens characteristics (radii of curvature, thicknesses of lenses or distances between the lenses, refractive indices, Abbe numbers, and effective aperture radii) of each lens are represented in Table 3.

line distance between an end portion of the object-side surface of the first lens 210 on which light is incident and an optical axis.

In the example, the first lens 210 may have a positive refractive power, and a first surface of the first lens 210 may be convex in a paraxial region and a second surface of the first lens 210 may be concave in the paraxial region.

The second lens 220 may have a negative refractive power, and a first surface of the second lens 220 may be convex in a paraxial region and a second surface of the second lens 220 may be concave in the paraxial region.

The first lens 210 and the second lens 220 may be formed of plastics having different optical characteristics. For

TABLE 3

| Surface No. | Element | Radius of Curvature | Thickness or Distance | Refractive Index | Abbe Number | Effective Aperture Radius | Focal Length |
|---|---|---|---|---|---|---|---|
| S1 | First Lens | 1.811666116 | 0.753 | 1.546 | 56.114 | 1.295 | 4.049 |
| S2 | Stop | 8.567964093 | 0.039 |  |  | 1.203 |  |
| S3 | Second Lens | 4.807809182 | 0.230 | 1.667 | 20.353 | 1.172 | −10.871 |
| S4 |  | 2.835474544 | 0.336 |  |  | 1.065 |  |
| S5 | Third Lens | 21.41477021 | 0.413 | 1.546 | 56.114 | 1.107 | 39.054 |
| S6 |  | −4820.375294 | 0.176 |  |  | 1.204 |  |
| S7 | Fourth Lens | 20.04744427 | 0.270 | 1.644 | 23.517 | 1.215 | 164.011 |
| S8 |  | 24.61319945 | 0.410 |  |  | 1.397 |  |
| S9 | Fifth Lens | −3.844055746 | 0.460 | 1.546 | 56.114 | 1.809 | 4.208 |
| S10 |  | −1.498745551 | 0.025 |  |  | 2.128 |  |
| S11 | Sixth Lens | −3.160706116 | 0.514 | 1.546 | 56.114 | 2.251 | 12.765 |
| S12 |  | −2.323565574 | 0.349 |  |  | 2.425 |  |
| S13 | Seventh Lens | −3.433913747 | 0.450 | 1.546 | 56.114 | 2.941 | −2.399 |
| S14 |  | 2.214835828 | 0.166 |  |  | 3.300 |  |
| S15 | Infrared Cut-off Filter | Infinity | 0.210 | 1.518 | 64.197 | 3.758 |  |
| S16 |  | Infinity | 0.652 |  |  | 3.818 |  |
| S17 | Imaging Plane | Infinity | −0.002 |  |  | 4.132 |  |

An overall focal length f of the optical imaging system may be 4.5971 mm, a field of view (FOV) of the optical imaging system may be 79.64°, Fno may be 1.77, TTL may be 5.55 mm, and an effective aperture radius of an object-side surface of the first lens 210 may be 1.295 mm.

Fno is a number indicating a brightness of the optical imaging system, and TTL is a distance from the object-side surface of the first lens 210 to the imaging plane of the image sensor 290. The effective aperture radius refers to a straight example, Abbe numbers of the first lens 210 and the second lens 220 may be different from each other.

The stop ST may be disposed between the first lens 210 and the second lens 220.

The third lens 230 may have a positive refractive power, and a first surface and a second surface of the third lens 230 may be convex in a paraxial region.

At least one inflection point may be formed on the first surface of the third lens 230. For example, the first surface of the third lens 230 may be convex in the paraxial region and become concave toward an edge of the first surface.

The second lens 220 and the third lens 230 may be formed of plastics having different optical characteristics. For example, Abbe numbers of the second lens 220 and the third lens 230 may be different from each other.

The fourth lens 240 may have a positive refractive power, and a first surface of the fourth lens 240 may be convex in a paraxial region and a second surface of the fourth lens 240 may be concave in the paraxial region.

The third lens 230 and the fourth lens 240 may be formed of plastics having different optical characteristics. For example, Abbe numbers of the third lens 230 and the fourth lens 240 may be different from each other.

The fifth lens 250 may have a positive refractive power, and a first surface of the fifth lens 250 may be concave in a paraxial region and a second surface of the fifth lens 250 may be convex in the paraxial region.

The fourth lens 240 and the fifth lens 250 may be formed of plastics having different optical characteristics. For example, Abbe numbers of the fourth lens 240 and the fifth lens 250 may be different from each other.

The sixth lens 260 may have a positive refractive power, and a first surface of the sixth lens 260 may be concave in a paraxial region and a second surface of the sixth lens 260 may be convex in the paraxial region.

The seventh lens 270 may have a negative refractive power, and a first surface and a second surface of the seventh lens 270 may be concave in the paraxial region.

At least one inflection point may be formed on the first surface and the second surface of the seventh lens 270. For example, the first surface and the second surface of the seventh lens 270 may be concave in the paraxial region and become convex toward an edge of the first surface and the second surface.

Respective surfaces of the first to seventh lenses 210 to 270 may have aspherical coefficients as illustrated in Table 4. For example, all of object-side surfaces and image-side surfaces of the first to seventh lenses 210 to 270 may be aspherical.

TABLE 4

|   | S1 | S2 | S3 |
|---|---|---|---|
| R | 1.83522713415814E+00 | 1.40291074196139E+01 | 5.33865796222443E+00 |
| K | −9.74633548300962E−01 | 2.72655517694607E+00 | 5.31810409723758E+00 |
| A | 2.26590833328727E−02 | −1.43688087533654E−01 | −1.94617508812868E−01 |
| B | −2.00584194164569E−02 | 4.45086191980934E−01 | 5.46498846177292E−01 |
| C | 8.97737510812574E−02 | −7.67984276681622E−01 | −9.80213365239904E−01 |
| D | −1.79987385103344E−01 | 8.30297202726275E−01 | 1.20925985530388E+00 |
| E | 2.02393547048812E−01 | −5.76237844585000E−01 | −1.00043413728333E+00 |
| F | −1.30506114113322E−01 | 2.48953403578293E−01 | 5.37707068096891E−01 |
| G | 4.46081708796556E−02 | −6.11205895670732E−02 | −1.67200911305756E−01 |
| H | −6.36344910136362E−03 | 6.41502929939828E−03 | 2.23872174719243E−02 |
| J |  |  |  |

|   | S4 | S5 | S6 |
|---|---|---|---|
| R | 2.86925505487888E+00 | 2.04787900111703E+01 | 9.60386118996625E+01 |
| K | −8.18300692945701E−01 | 0.00000000000000E+00 | 0.00000000000000E+00 |
| A | −7.32534890079652E−02 | −4.33693517640893E−02 | −1.18311597939585E−01 |
| B | 1.98592465423210E−01 | −2.82893475798193E−02 | 1.25800277353217E−01 |
| C | −3.99195865262604E−01 | 1.41019972102376E−01 | −2.60730544744581E−01 |
| D | 6.62569122574163E−01 | −3.76424553439978E−01 | 3.81649877920399E−01 |
| E | −7.34632516315750E−01 | 5.21658307760453E−01 | −4.01637900940920E−01 |
| F | 5.12678849902191E−01 | −4.05246918804513E−01 | 2.66167185618519E−01 |
| G | −1.93384868435191E−01 | 1.70108688862580E−01 | −9.22207585952108E−02 |
| H | 3.01207393075946E−02 | −2.96747621149980E−02 | 1.54732557291730E−02 |
| J |  |  |  |

|   | S7 | S8 | S9 |
|---|---|---|---|
| R | 1.40075702916491E+01 | 1.15592371571900E+01 | −4.49336420577339E+00 |
| K | −7.50001392010044E+00 | −4.33425266095967E+01 | −3.04954010396314E+01 |
| A | −2.08292663318237E−01 | −1.43367692122282E−01 | −1.16402303245625E−01 |
| B | 5.66148591028170E−02 | 2.76742587689277E−03 | 1.62265812296945E−01 |
| C | 3.40600985672729E−02 | 1.49392908679366E−01 | −1.14712569994533E−01 |
| D | −2.02516415176840E−01 | −3.18985424830112E−01 | 2.29794627269044E−02 |
| E | 3.37512665660287E−01 | 3.52614938939856E−01 | 1.89459451732170E−02 |
| F | −2.98411113995864E−01 | −2.19999718253768E−01 | −1.57987873959162E−02 |
| G | 1.32104121252353E−01 | 7.24759120905351E−02 | 4.54364912733604E−03 |
| H | −2.26110146358224E−02 | −9.55215892884372E−03 | −4.61188239736531E−04 |
| J |  |  |  |

|   | S10 | S11 | S12 |
|---|---|---|---|
| R | −1.58297652182677E+00 | −4.42065593027725E+00 | −3.37606275153478E+00 |
| K | −1.60480118848950E+00 | 9.08002671441049E−02 | −2.19041021858542E−01 |
| A | 7.10808502750410E−02 | 1.73338488647160E−01 | 1.55852883866887E−01 |
| B | −6.27870541858130E−02 | −2.16667189272054E−01 | −2.01911582723052E−01 |
| C | 8.16676861811079E−02 | 1.49353721303268E−01 | 1.23928384185870E−01 |
| D | −6.61406949004544E−02 | −6.98540049571404E−02 | −4.86815912471080E−02 |
| E | 2.93674428236592E−02 | 2.00227395470170E−02 | 1.27732855642596E−02 |
| F | −7.10169084322472E−03 | −3.25049871848573E−03 | −2.10168018994990E−03 |

TABLE 4-continued

| | S13 | S14 |
|---|---|---|
| G | 8.74411265692385E−04 | 2.73473609723023E−04 | 1.91571269684018E−04 |
| H | −4.28055955949656E−05 | −9.26453588338803E−06 | −7.28354177645412E−06 |
| J | | |

| | S13 | S14 |
|---|---|---|
| R | −4.39306146960093E+00 | 2.20056616235733E+00 |
| K | −2.35503787444593E+00 | −1.28300867659821E+00 |
| A | 3.72126377803153E−03 | −1.36052977139846E−01 |
| B | −1.27637159255959E−01 | 4.38338125997012E−02 |
| C | 8.67053143583044E−02 | −1.02008853905646E−02 |
| D | −2.63226232169783E−02 | 1.86907054395250E−03 |
| E | 4.46815594250577E−03 | −2.84833394276871E−04 |
| F | −4.40847059949595E−04 | 3.29842078388580E−05 |
| G | 2.37518537350670E−05 | −2.58132027389574E−06 |
| H | −5.42646480112993E−07 | 1.20687625160571E−07 |
| J | | −2.54483614636522E−09 |

Figure 4:
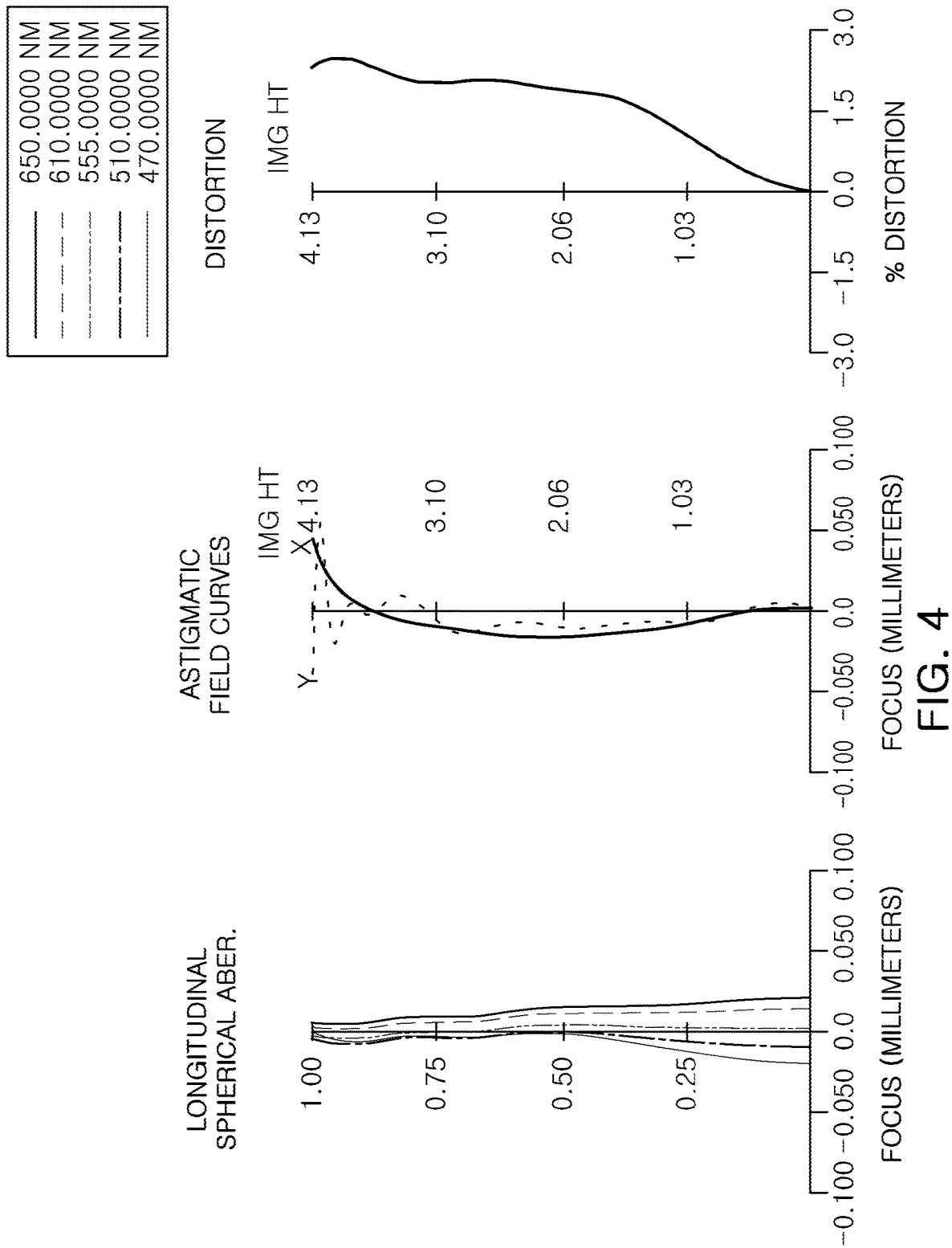
FIG. 4 illustrates graphs having curves representing aberration characteristics of the optical imaging system illustrated in FIG. 3.

The optical imaging system configured as described above may have aberration characteristics illustrated in FIG. 4.

An optical imaging system according to another example will be described with reference to FIGS. 5 and 6.

The optical imaging system may include a first lens 310, a second lens 320, a third lens 330, a fourth lens 340, a fifth lens 350, a sixth lens 360, and a seventh lens 370, and may further include an infrared cut-off filter 380, an image sensor 390, and a stop ST.

Lens characteristics (radii of curvature, thicknesses of lenses or distances between the lenses, refractive indices, Abbe numbers, and effective aperture radii) of each lens are represented in Table 5.

TABLE 5

| Surface No. | Element | Radius of Curvature | Thickness or Distance | Refractive Index | Abbe Number | Effective Aperture Radius | Focal Length |
|---|---|---|---|---|---|---|---|
| S1 | First Lens | 1.800182348 | 0.690 | 1.546 | 56.114 | 1.250 | 4.232 |
| S2 | | 7.047112829 | 0.025 | | | 1.115 | |
| S3 | Second Lens | 4.18239827 | 0.299 | 1.667 | 20.353 | 1.085 | −18.394 |
| S4 | Stop | 2.767121852 | 0.318 | | | 0.906 | |
| S5 | Third Lens | −25.27679923 | 0.476 | 1.546 | 56.114 | 0.858 | 18.226 |
| S6 | | −7.187216894 | 0.104 | | | 1.045 | |
| S7 | Fourth Lens | −15.49682442 | 0.341 | 1.644 | 23.517 | 1.073 | −48.758 |
| S8 | | −30.86072908 | 0.513 | | | 1.293 | |
| S9 | Fifth Lens | −6.857286908 | 0.565 | 1.546 | 56.114 | 1.520 | 4.403 |
| S10 | | −1.831639777 | 0.260 | | | 1.806 | |
| S11 | Sixth Lens | −2.149049224 | 0.420 | 1.644 | 23.517 | 1.829 | 15.624 |
| S12 | | −1.906515498 | 0.050 | | | 2.200 | |
| S13 | Seventh Lens | −4.585826603 | 0.664 | 1.546 | 56.114 | 2.744 | −2.480 |
| S14 | | 2.019126811 | 0.500 | | | 3.330 | |
| S15 | Infrared Cut-off | Infinity | 0.210 | 1.518 | 64.197 | 3.848 | |
| S16 | | Infinity | 0.365 | | | 3.919 | |
| S17 | Imaging Plane | Infinity | 0.000 | | | 4.128 | |

An overall focal length f of the optical imaging system may be 4.8973 mm, a field of view (FOV) of the optical imaging system may be 76.564°, Fno may be 2.1849, TTL may be 5.8 mm, and an effective aperture radius of an object-side surface of the first lens 310 may be 1.25 mm.

Fno is a number indicating a brightness of the optical imaging system, and TTL is a distance from the object-side surface of the first lens 310 to the imaging plane of the image sensor 390. The effective aperture radius refers to a straight line distance between an end portion of the object-side surface of the first lens 310 on which light is incident and an optical axis.

In the example, the first lens 310 may have a positive refractive power, and a first surface of the first lens 310 may be convex in a paraxial region and a second surface of the first lens 310 may be concave in the paraxial region.

The second lens 320 may have a negative refractive power, and a first surface of the second lens 320 may be convex in the paraxial region and a second surface of the second lens 320 may be concave in the paraxial region.

The first lens 310 and the second lens 320 may be formed of plastics having different optical characteristics. For example, Abbe numbers of the first lens 310 and the second lens 320 may be different from each other.

The third lens 330 may have a positive refractive power, and a first surface of the third lens 330 may be concave in a paraxial region and a second surface of the third lens 330 may be convex in the paraxial region.

The first surface of the third lens 330 may also be concave in a point other than the paraxial region.

The second lens 320 and the third lens 330 may be formed of plastics having different optical characteristics. For example, Abbe numbers of the second lens 320 and the third lens 330 may be different from each other.

The stop ST may be disposed between the second lens 320 and the third lens 330.

The fourth lens 340 may have a negative refractive power, and a first surface of the fourth lens 340 may be concave in a paraxial region and a second surface of the fourth lens 340 may be convex in the paraxial region.

The third lens 330 and the fourth lens 340 may be formed of plastics having different optical characteristics. For example, Abbe numbers of the third lens 330 and the fourth lens 340 may be different from each other.

The fifth lens 350 may have a positive refractive power, and a first surface of the fifth lens 350 may be concave in a paraxial region and a second surface of the fifth lens 350 may be convex in the paraxial region.

The fourth lens 340 and the fifth lens 350 may be formed of plastics having different optical characteristics. For example, Abbe numbers of the fourth lens 340 and the fifth lens 350 may be different from each other.

The sixth lens 360 may have a positive refractive power, and a first surface of the sixth lens 360 may be concave in a paraxial region and a second surface of the sixth lens 360 may be convex in the paraxial region.

The fifth lens 350 and the sixth lens 360 may be formed of plastics having different optical characteristics. For example, Abbe numbers of the fifth lens 350 and the sixth lens 360 may be different from each other.

The seventh lens 370 may have a negative refractive power, and a first surface and a second surface of the seventh lens 370 may be concave in a paraxial region.

At least one inflection point may be formed on the first surface and the second surface of the seventh lens 370. For example, the first surface and the second surface of the seventh lens 370 may be concave in the paraxial region and become convex toward an edge of the first surface and the second surface.

The sixth lens 360 and the seventh lens 370 may be formed of plastics having different optical characteristics. For example, Abbe numbers of the sixth lens 360 and the seventh lens 370 may be different from each other.

Respective surfaces of the first to seventh lenses 310 to 370 may have aspherical coefficients as illustrated in Table 6. For example, all of object-side surfaces and image-side surfaces of the first to seventh lenses 310 to 370 may be aspherical.

TABLE 6

|   | S1 | S2 | S3 |
|---|---|---|---|
| R | 1.80018234839597E+00 | 7.04711282923742E+00 | 4.16239826968810E+00 |
| K | −8.34889321860925E−01 | 1.00000000000000E+00 | 8.32454606857578E−02 |
| A | 2.15966885311760E−02 | −2.16250236935789E−01 | −2.23828295644143E−01 |
| B | 9.16230379014240E−04 | 6.53001618573337E−01 | 6.27105729333332E−01 |
| C | 1.28177902669448E−02 | −1.25676596282991E+00 | −1.20305629475367E+00 |
| D | −2.47217540440512E−02 | 1.67008308604790E+00 | 1.70820127497503E+00 |
| E | 2.90608707310614E−02 | −1.49315800790140E+00 | −1.68520494915210E+00 |
| F | −1.93668361452121E−02 | 8.38791917449356E−01 | 1.06447370306344E+00 |
| G | 6.66834831817610E−03 | −2.63184738274900E−01 | −3.75130486668352E−01 |
| H | −1.10133216450531E−03 | 3.45248337388287E−02 | 5.49409933601271E−02 |
| J |  |  |  |

|   | S4 | S5 | S6 |
|---|---|---|---|
| R | 2.76712185214173E+00 | −2.52767992323071E+01 | −7.18721689393983E+00 |
| K | 2.78401076536001E−01 | 0.00000000000000E+00 | 0.00000000000000E+00 |
| A | −4.94623230297926E−02 | −4.27213317646200E−02 | −1.63625341265501E−01 |
| B | 1.22378266802963E−01 | −1.39022697430576E−02 | 1.17624536366764E−01 |
| C | −2.58977274663547E−01 | 6.14621949342329E−02 | −6.38250169079046E−02 |
| D | 5.84134242241544E−01 | −1.92884881699046E−01 | −6.74591478094611E−02 |
| E | −8.49932337480939E−01 | 2.78443125567742E−01 | 1.14936404425720E−01 |
| F | 6.67683804643727E−01 | −2.35610546856676E−01 | −7.10073828109379E−02 |
| G | −2.01482863164181E−01 | 1.19416862244874E−01 | 2.03055124960841E−02 |
| H | −6.03710665073330E−04 | −2.59867719463389E−02 | −2.19139545077502E−03 |
| J |  |  |  |

|   | S7 | S8 | S9 |
|---|---|---|---|
| R | −1.54968244221993E+01 | −3.08607290793363E+01 | −6.85728690753499E+00 |
| K | 9.99670052408577E−01 | −4.21245120177213E+01 | −2.55159854616352E+01 |
| A | −2.39425985246637E−01 | −1.26418583557003E−01 | −2.80291491662517E−02 |
| B | 1.06355277286656E−01 | 9.38053753104551E−03 | −6.34570393636787E−02 |
| C | 1.56863842885098E−02 | 6.72061322353884E−02 | 9.63608944651707E−02 |
| D | −1.43914343115103E−01 | −1.67519676594169E−01 | 8.89539289456748E−02 |
| E | 1.31833956597111E−01 | 1.55847153349475E−01 | 5.41702533717285E−02 |
| F | −7.96647886594316E−02 | −8.64754452902435E−02 | −2.31289314345914E−02 |
| G | 4.61475248838621E−02 | 2.76556179073559E−02 | 5.74805200577841E−03 |
| H | −1.35823349094360E−02 | −3.69536203269675E−03 | −5.79572873549636E−04 |
| J |  |  |  |

|   | S10 | S11 | S12 |
|---|---|---|---|
| R | −1.63163977694415E+00 | −2.14904922443800E+00 | 1.90651549758894E+00 |
| K | −1.38005023116179E+00 | 1.23985439548585E−02 | −8.71707405790815E−01 |
| A | −2.28943941547519E−02 | −9.18140918049588E−02 | −1.06569726871560E−02 |
| B | 1.76632568073721E−02 | 1.77167685249489E−01 | 6.24472312973289E−02 |
| C | 4.75247002732813E−03 | −1.27617078509477E−01 | −5.32714124558946E−02 |
| D | −6.70069198679465E−03 | 4.68756422076953E−02 | 2.22142788616940E−02 |
| E | 2.19955108058053E−03 | −9.15869118751174E−03 | −5.39945032166689E−03 |
| F | −3.01203221565347E−04 | 8.73381649202750E−04 | 8.07087389410928E−04 |
| G | 1.42760480920076E−05 | −2.52847568814034E−05 | −6.97660140484156E−05 |
| H | 1.16920969354525E−07 | −8.34602290206885E−07 | 2.62743757482025E−06 |
| J |  |  |  |

TABLE 6-continued

| | S13 | S14 |
|---|---|---|
| R | −4.58582660269232E+00 | 2.01912681118960E+00 |
| K | −3.85836738755011E+00 | −1.28286090537392E+00 |
| A | −6.30057188531074E−02 | −1.39220854295619E−01 |
| B | −6.34813030271240E−03 | 5.89523285971814E−02 |
| C | 1.48442712573260E−02 | −2.01074176247113E−02 |
| D | −4.81605965594631E−03 | 5.08896496415405E−03 |
| E | 7.79855263598678E−04 | −9.16720137766966E−04 |
| F | −7.12543439892911E−05 | 1.12097612397932E−04 |
| G | 3.52595011899585E−06 | −8.77807588519196E−06 |
| H | −7.40041801791364E−08 | 3.95815597771651E−07 |
| J | | −7.78501304752392E−09 |

Figure 6:
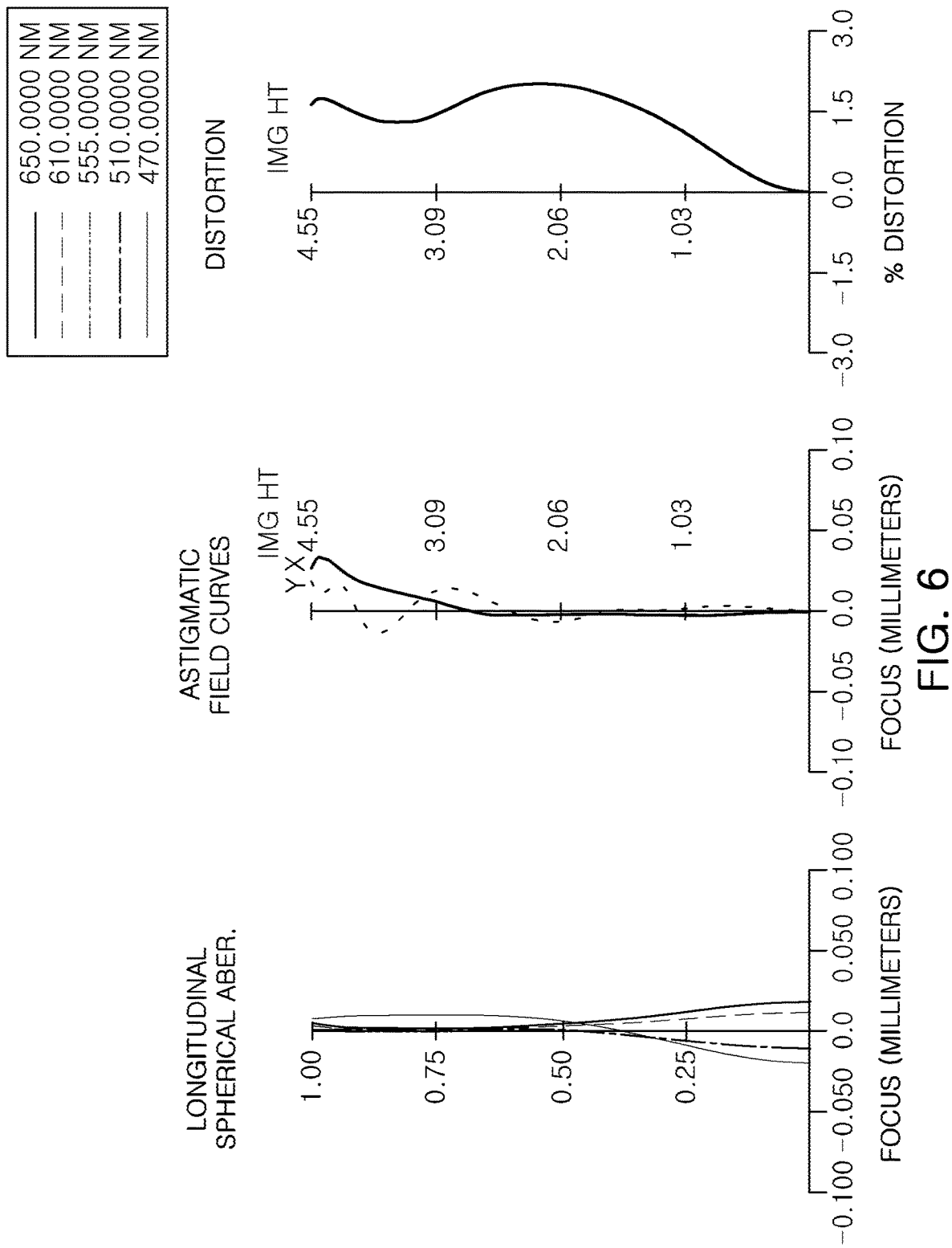
FIG. 6 illustrates graphs having curves representing aberration characteristics of the optical imaging system illustrated in FIG. 5.

The optical imaging system configured as described above may have aberration characteristics illustrated in FIG. 6.

TABLE 7

Figure 3:
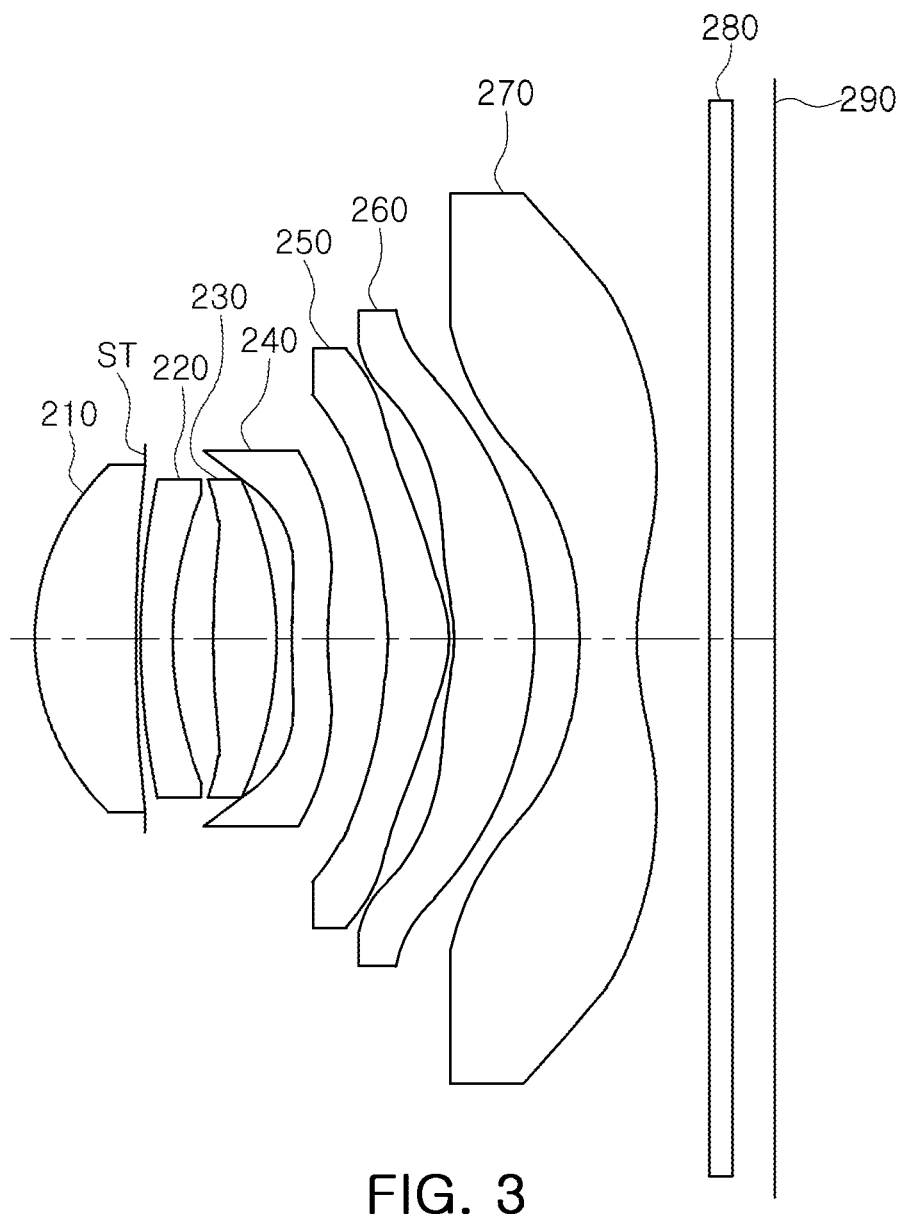
FIG. 3 is a view illustrating an optical imaging system according to an example.
Figure 5:
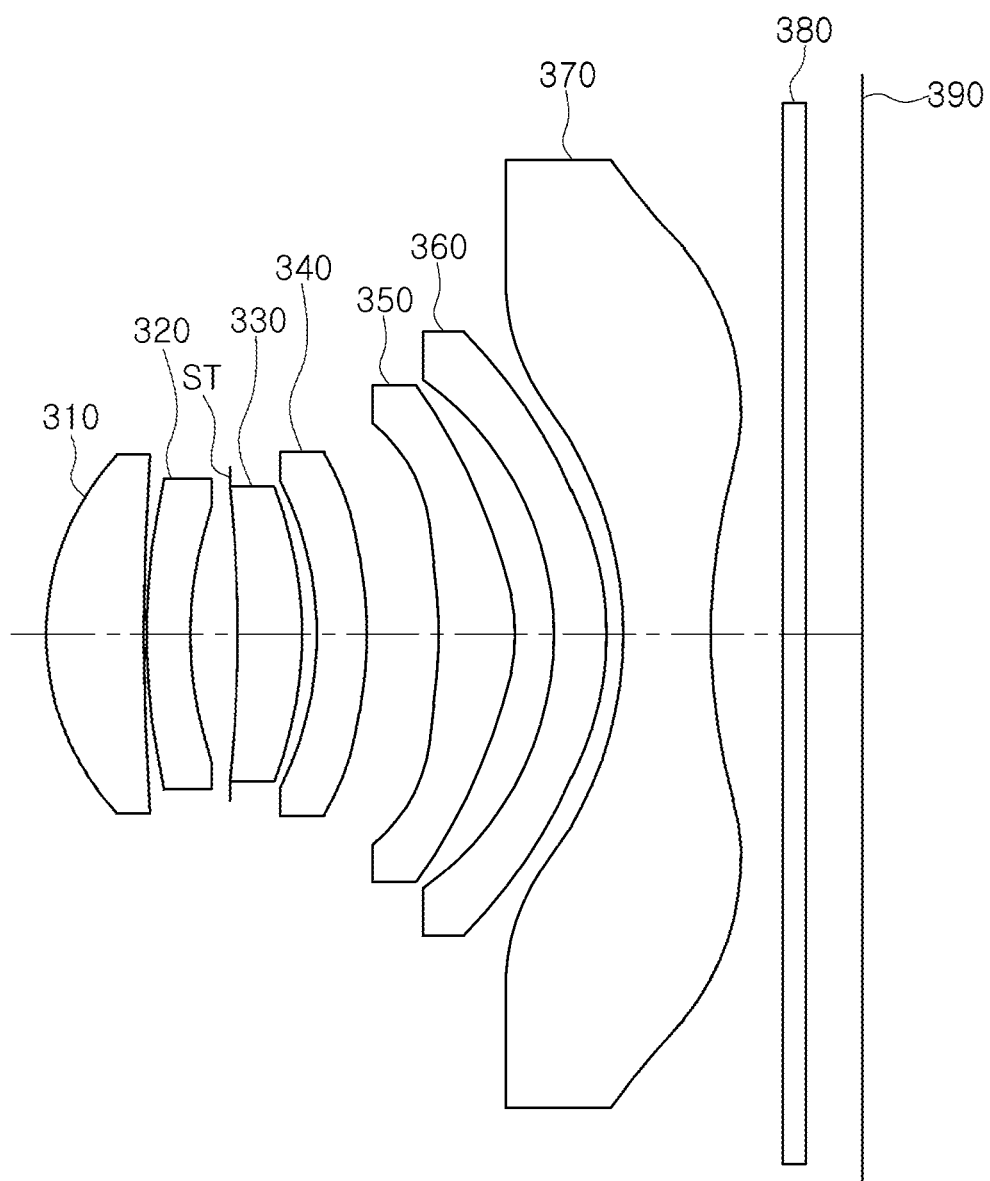
FIG. 5 is a view illustrating an optical imaging system according to an example.

| | Example of FIG. 1 | Example of FIG. 3 | Example of FIG. 5 |
|---|---|---|---|
| TTL | 5.5 | 5.55 | 5.8 |
| f | 4.5814 | 4.5971 | 4.8973 |
| Fno | 1.7689 | 1.77 | 2.1849 |
| FOV | 79.799 | 79.64 | 76.564 |
| TTL/f | 1.2005 | 1.2073 | 1.1843 |
| R10 | −1.582976522 | −1.498745551 | −1.831639777 |
| R10/f | −0.3455 | −0.3260 | −0.3740 |
| f1 | 3.7846 | 4.0489 | 4.2323 |
| f1/f | 0.8261 | 0.8807 | 0.8642 |
| f5 | 4.2337 | 4.2085 | 4.4030 |
| f5/f | 0.9241 | 0.9155 | 0.8991 |

Table 7 shows a comparison of values of each of the optical imaging systems described in the examples above. For example, Table shows a comparison of TTL, overall focal length (f), Fno, field of view (FOV), TTL/f, radius of curvature for the second surface of the fifth lens (R10), R10/f, focal length of the first lens (f1), f1/f, focal length of the fifth lens (f5), and f5/f for each of three examples of an optical imaging system as described above.

According to an optical imaging system of the various examples disclosed herein, the optical imaging system may be miniaturized and aberration may be easily corrected to implement high resolution.

The optical imaging systems described above are capable of being easily used in a portable electronic device and easily performing aberration correction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power, a convex object-side surface in a paraxial region thereof, and a concave image-side surface in a paraxial region thereof;
   a second lens having a negative refractive power, a convex object-side surface in a paraxial region thereof, and a concave image-side surface in a paraxial region thereof;
   a third lens having a positive refractive power;
   a fourth lens having a negative refractive power;
   a fifth lens having a positive refractive power;
   a sixth lens having a refractive power; and
   a seventh lens having a refractive power,
   wherein the first to seventh lenses are sequentially arranged in ascending numerical order along an optical axis of the optical imaging system from an object side of the optical imaging system toward an image side of the optical imaging system,
   TTL/f<1.3, where TTL is a distance along the optical axis from the object-side surface of the first lens to an imaging plane of the optical imaging system, and f is an overall focal length of the optical imaging system, and
   −0.38≤R10/f≤−0.32, where R10 is a radius of curvature of an image-side surface of the fifth lens at the optical axis, and f is the overall focal length of the optical imaging system.

2. The optical imaging system of claim 1, wherein the seventh lens has a negative refractive power.

3. The optical imaging system of claim 1, wherein the third lens has a convex object-side surface in a paraxial region thereof.

4. The optical imaging system of claim 1, wherein the third lens has a convex image-side surface in a paraxial region thereof.

5. The optical imaging system of claim 1, wherein the fourth lens has a concave object-side surface in a paraxial region thereof.

6. The optical imaging system of claim 1, wherein the fourth lens has a concave image-side surface in a paraxial region thereof.

7. The optical imaging system of claim 1, wherein the fifth lens has a concave object-side surface in a paraxial region thereof.

8. The optical imaging system of claim 7, wherein the image-side surface of the fifth lens is convex in a paraxial region thereof.

9. The optical imaging system of claim 1, wherein the seventh lens has a concave image-side surface in a paraxial region thereof.

10. The optical imaging system of claim 1, wherein the fourth lens is made of a plastic material having an Abbe number, and the fifth lens is made of a plastic material having an Abbe number that is different from the Abbe number of the plastic material of the fourth lens.

11. The optical imaging system of claim 1, wherein the fifth to seventh lenses have a same Abbe number.

12. The optical imaging system of claim 1, wherein the fifth to seventh lenses have a same refractive index.

13. The optical imaging system of claim 1, wherein the first lens is made of a plastic material having an Abbe number, and the second lens is made of a plastic material having an Abbe number that is different from the Abbe number of the plastic material of the first lens.

14. The optical imaging system of claim 13, wherein the second lens is made of a plastic material having an Abbe number, and the third lens is made of a plastic material having an Abbe number that is different from the Abbe number of the plastic material of the second lens.

15. The optical imaging system of claim 14, wherein the third lens is made of a plastic material having an Abbe number, and the fourth lens is made of a plastic material having an Abbe number that is different from the Abbe number of the plastic material of the third lens.

16. The optical imaging system of claim 1, wherein at least one inflection point is formed on either one or both of an object-side surface of the seventh lens and an image-side surface of the seventh lens.

* * * * *